US 9,232,142 B2
United States Patent
McManus et al.

(10) Patent No.: US 9,232,142 B2
(45) Date of Patent: Jan. 5, 2016

(54) THERMOGRAPHY METHODS

(75) Inventors: Thomas J. McManus, Plymouth, MN (US); Kirk R. Johnson, Rogers, MN (US); Daren M. Thomas, Plymouth, MN (US); Jody J. Forland, St. Bonifacius, MN (US); Eugene Skobov, Eden Prairie, MN (US)

(73) Assignee: Fluke Corporation, Everett, WA (US)

( * ) Notice: Subject to any disclaimer, the term of this patent is extended or adjusted under 35 U.S.C. 154(b) by 362 days.

(21) Appl. No.: 12/828,442

(22) Filed: Jul. 1, 2010

(65) Prior Publication Data

US 2011/0001809 A1    Jan. 6, 2011

Related U.S. Application Data

(60) Provisional application No. 61/222,186, filed on Jul. 1, 2009.

(51) Int. Cl.
*H04N 7/18* (2006.01)
*H04N 5/232* (2006.01)
*G01J 5/02* (2006.01)
*H04N 5/33* (2006.01)
*G01J 5/00* (2006.01)

(52) U.S. Cl.
CPC .............. *H04N 5/23293* (2013.01); *G01J 5/02* (2013.01); *G01J 5/025* (2013.01); *H04N 5/33* (2013.01); *H04N 5/332* (2013.01); *G01J 2005/0077* (2013.01)

(58) Field of Classification Search
CPC .................................. H04N 7/18; H04N 5/33
USPC .......................................................... 348/61
See application file for complete search history.

(56) References Cited

U.S. PATENT DOCUMENTS 7,535,002 B2    5/2009   Johnson
2006/0249679 A1*  11/2006  Johnson et al. ............... 250/332
(Continued)

FOREIGN PATENT DOCUMENTS

EP       1299699      12/2001
WO    WO93-06691 A1    4/1993

OTHER PUBLICATIONS

Brochure, Marathon MM, MR, FA, FR, NonContact Temperature Measurement for Industrial Applications, www.raytek.com, Raytek Corporation (3112321 Rev. G) Feb. 2008.
Video, located http://www.flir.com.hk/TripleFusion_video.htm, viewed May 4, 2010.
(Continued)

*Primary Examiner* — June Sison
*Assistant Examiner* — Steven Nguyen
(74) *Attorney, Agent, or Firm* — Fredrikson & Byron, P.A.

(57) ABSTRACT

A method for presenting a thermal image within a visible light image includes the steps of: identifying an outline of each object of interest within the visible light image; and, selecting an area of the visible light image, whose edge corresponds to the outline of each object of interest, in which to present the thermal image. An alternative method includes the steps of: identifying an area of interest within the thermal image; and selecting another area, separate from the area of interest, from which to remove a portion of the thermal image in order to display the visible light image therein. The visible light and thermal images are captured by a system that includes a visible light camera module and an infrared camera module. The visible light and thermal images are displayed on a display of the system, and selections are made via an interactive element of the system.

23 Claims, 9 Drawing Sheets

(56) References Cited

U.S. PATENT DOCUMENTS

| | | | |
|---|---|---|---|
| 2007/0036456 A1* | 2/2007 | Hooper | 382/274 |
| 2009/0008558 A1* | 1/2009 | Strandemar et al. | 250/339.05 |
| 2009/0050806 A1 | 2/2009 | Schmidt et al. | |
| 2010/0148066 A1* | 6/2010 | Stratmann et al. | 250/330 |
| 2010/0238286 A1* | 9/2010 | Boghossian et al. | 348/143 |
| 2011/0068269 A1* | 3/2011 | DeMarco et al. | 250/330 |

OTHER PUBLICATIONS

Extended Search Report from Application No. 10251182.1 dated Dec. 19, 2013, six pages.

"Matting for Taking What They Want—Analysis and Comparison of Photoshop Matting Techniques," Yuemi, LV, Computer Knowledge and Technology, Academic Exchange and Machine Translation of the same, Jun. 30, 2006, 3 pages.

* cited by examiner

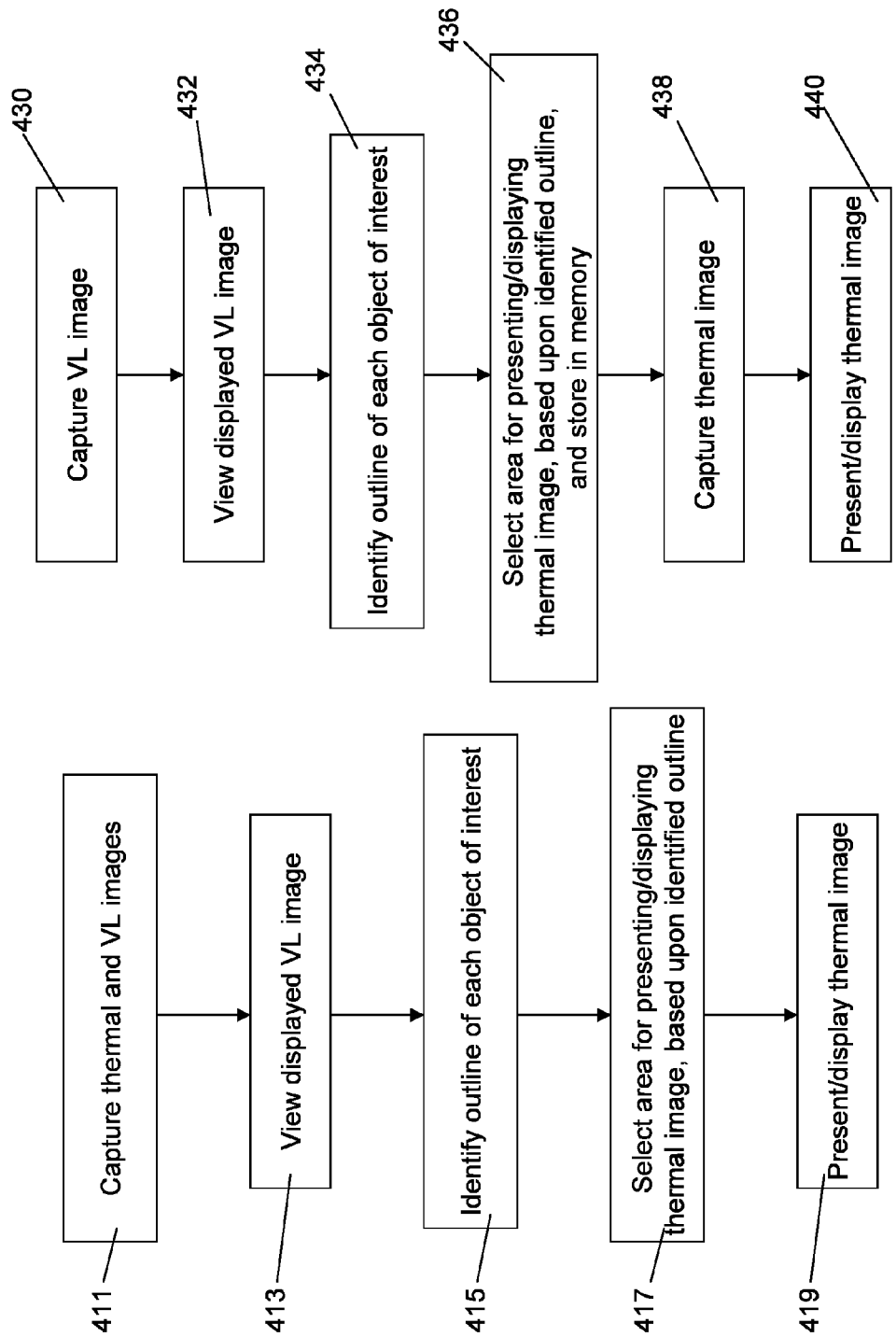

THERMOGRAPHY METHODS

PRIORITY CLAIM

The present application claims priority to U.S. provisional application Ser. No. 61/222,186, which was filed on Jul. 1, 2009, and is hereby incorporated by reference.

TECHNICAL FIELD

The present invention pertains to thermography and more particularly to methods for presenting a thermal image within a visible light image.

BACKGROUND

Thermal images of systems that include electrical and/or mechanical devices and structures can be useful for monitoring and/or analyzing the performance thereof, both during design and development, for example, for design optimization purposes, and during operational service, for example, for inspection and maintenance purposes. The thermal, or infrared images may be captured and displayed by an infrared (IR) camera module of a thermography system; the IR camera module may include a focal plane array (FPA) of microbolometers, for capturing IR radiation, and electronics which are adapted to convert the captured IR radiation to temperature data, and then to scale and map the temperature data to an array of pixels, wherein a color, or a gray-scale value, of each pixel corresponds to a detected temperature, or temperature range.

In recent years thermography systems have been developed to include a visible light (VL) camera module in conjunction with the IR camera module, so that thermal images can be merged with corresponding visible light images in order to provide a more tangible/structural context for the thermal images. Those skilled in the art call this merging of images 'fusion', and methods for fusion are known in the art, for example, being described in commonly assigned U.S. patent application publication US 2008/0099678, which is hereby incorporated by reference, in its entirety. A variety of methods for presenting a thermal image fused with a corresponding visible light image are known in the art, one example of which is known as FLIR Triple Fusion™, wherein an infrared image may be moved, resized and reshaped inside a visible light image. Yet, there is still a need for new methods for presenting thermal images that can improve the ease of viewing the thermal images, for more efficient monitoring and/or analysis of systems.

BRIEF DESCRIPTION OF THE DRAWINGS

The following drawings are illustrative of particular embodiments of the invention, and are not intended to limit the scope of the invention. The drawings are not to scale (unless so stated) and are intended for use in conjunction with the explanations in the following detailed description. Embodiments of the disclosure will hereinafter be described in conjunction with the appended drawings, wherein like numerals denote like elements.

FIGS. 4A-B are flow charts outlining alternative methods of the present invention.

DETAILED DESCRIPTION

The following detailed description is exemplary in nature and is not intended to limit the scope, applicability, or configuration of the invention in any way. Rather, the following description provides practical illustrations for implementing exemplary embodiments. Utilizing the teaching provided herein, those skilled in the art will recognize that many of the examples have suitable alternatives that can be utilized.

Figure 1:
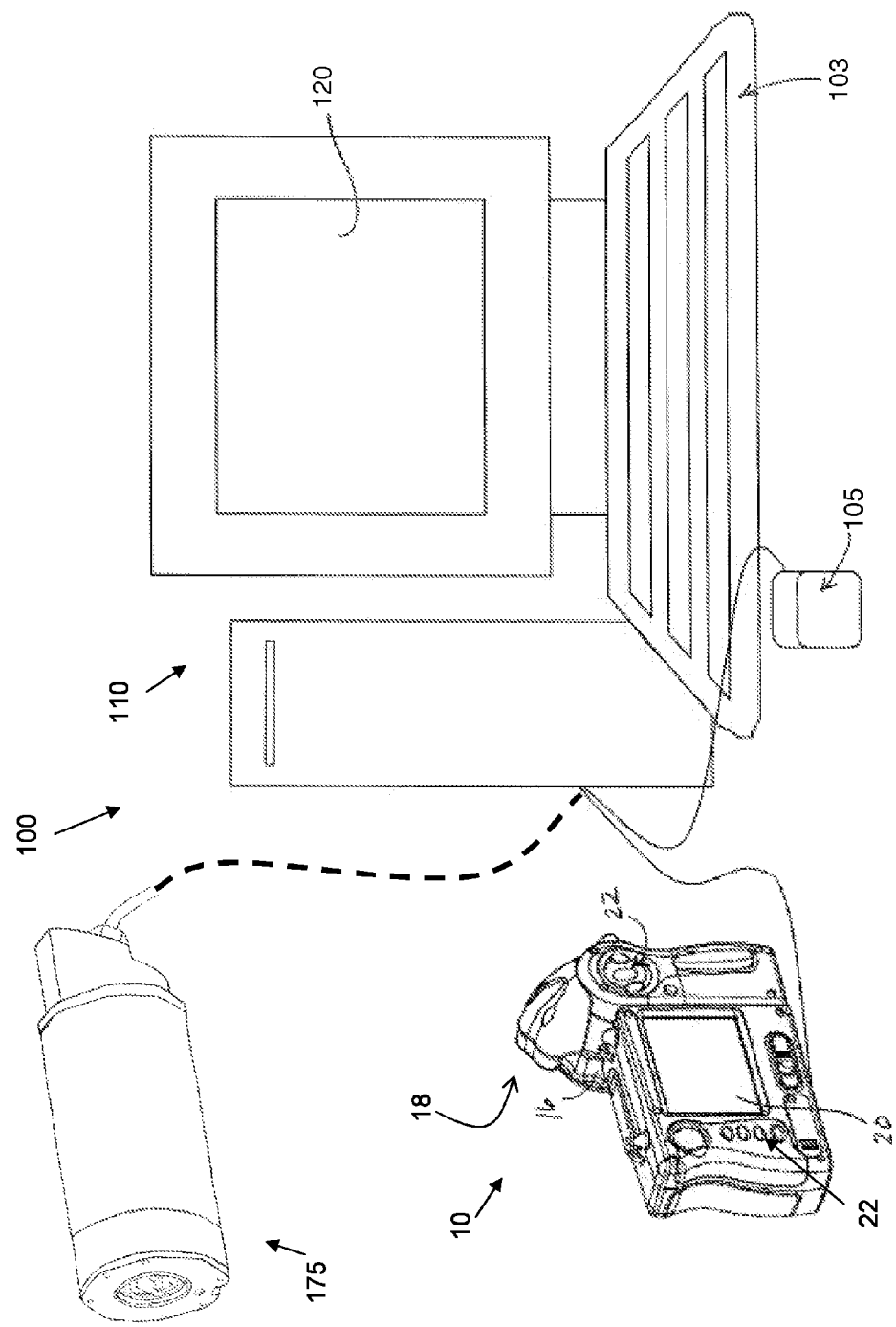
FIG. 1 is a schematic overview of an exemplary thermography system, with which methods of the present invention may be employed.

FIG. 1 is a schematic overview of an exemplary thermography system 100, with which methods of the present invention may be employed. FIG. 1 illustrates a handheld-type camera 10, for example to take still images, and a monitoring-type camera 175 designed to be mounted for monitoring at a fixed location, for example, to take still and/or video images. Each of cameras 10, 175 includes an IR camera module and a VL camera module. For example, the IR camera module of camera 10 includes a focus ring 16, for focusing an IR lens (not shown) of camera 10, and an IR sensor assembly (not shown), for example, a microbolometer focal plane array, which is aligned with the IR lens that is focused with ring 16 to receive IR radiation from a scene toward which the lens is pointed, or directed; and the visible light (VL) camera module of camera 10 may be located in the region to which arrow 18 points. Electronics that are included in each of the cameras 10, 175 have the capability to convert the raw IR radiation to digital temperature data, and then to correct, map and scale the data for display as a thermal image fused with a VL image, captured by the VL camera module, according to methods known in the art. Some examples of a camera, like camera 10, are the Ti25 available from Fluke Corporation, and the Fluke Ti 55 Thermal Imager. FIG. 1 further illustrates a workstation 110, for example, a personal computer, which may be connected to one or both of cameras 10, 175. A thermography software program, which is loaded in one or both of camera 10 and workstation 110, in conjunction with peripheral tools, such as buttons 22 of camera 10 and/or mouse 105 and key board 103 of workstation 110, can be used to manipulate the display/presentation of the captured thermal images fused with the captured VL images on one or both of a display 20 of camera 10 and a display 120 of workstation 110, according to methods of the present invention. It should be noted that, within the context of the present disclosure, the term 'image' may be used broadly for both still and video images.

Figure 2A:
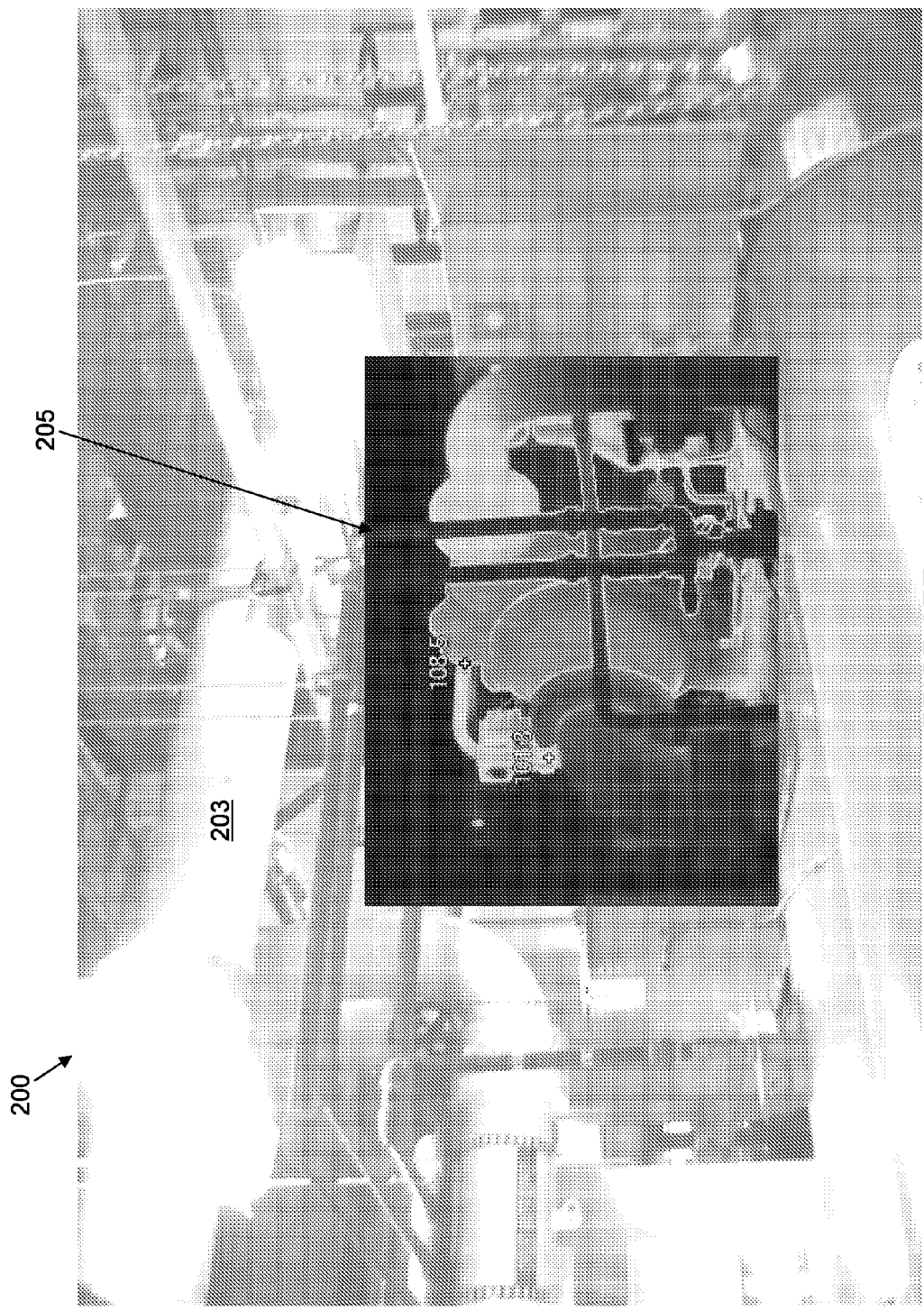
FIGS. 2A-B are exemplary, prior art, fused thermal and VL picture-in-picture type images.
Figure 2B:
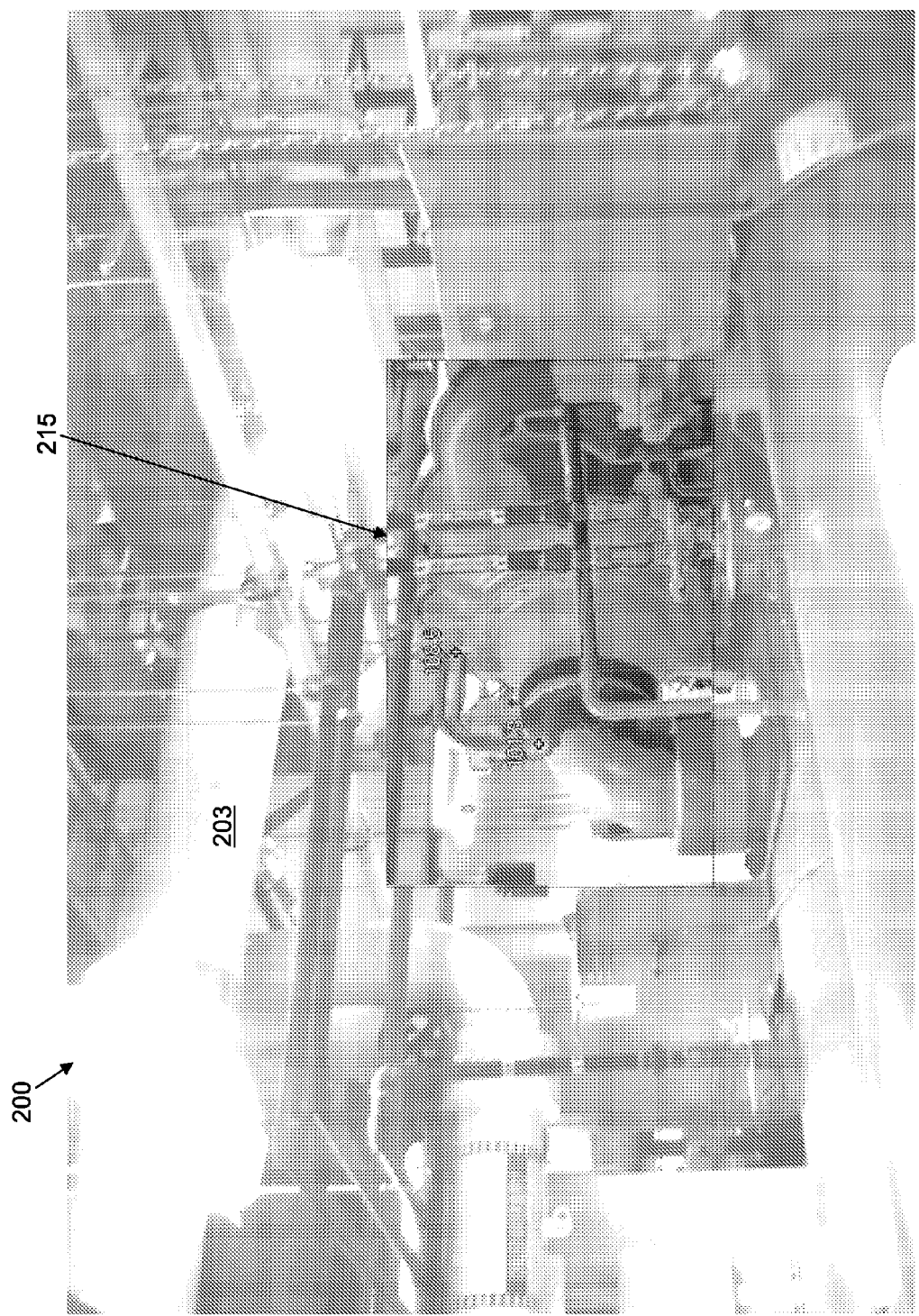

FIGS. 2A-B are exemplary, prior art, fused thermal and VL picture-in-picture type images 200, 210 of a scene within a chilling station. FIG. 2A illustrates a thermal image 205 presented within, and filling, a predetermined area of a VL image 203 of the scene; the area has been selected in order to direct a viewer's attention to one or more particular physical objects of interest within the scene, for example, including a pipe whose ends are marked with temperature readings in FIG. 2A. Thermal image 205 is wholly composed of gray-scale coding (originally composed of color coding), which overlays the VL image 203 in the predetermined area and corresponds to a measured temperature distribution of every object within the predetermined area. FIG. 2B illustrates a thermal image 215 blended with VL image 203 in a predetermined area of VL image 203, which also encompasses the aforementioned pipe, wherein an extent of the gray-scale coding (originally color coding) is limited according to at least one temperature threshold criterion, such that only those portions of thermal image 215, which meet the criterion, are presented within the area. Methods for presenting/displaying thermal images according to these alternative characteristics are known to those skilled in the art. For example, a blending of thermal and VL images is described in the aforementioned commonly-assigned '678 patent application publication as alpha-blending, and a limited presentation of a thermal image, which is based on a temperature threshold criterion, is described in the same publication as a color-alarm.

With reference to FIGS. 2A-B, it may be appreciated that the selected areas, although significantly smaller than an entire area of VL image 203, still encompass portions of the captured scene within the chilling station, in addition to the object(s) of interest, from which temperature information is not necessarily required for monitoring and/or analysis. Although previously disclosed methods, for example, as referred to in the Background of the present disclosure, allow for moving, resizing and reshaping the areas of thermal images 205, 215 within VL image 203, for alternative configurations of picture-in-picture type images 200, 210, the shape of these selected areas have heretofore been somewhat limited. According to preferred methods of the present invention, an area for a presentation of a thermal image, within a VL image, is established to have a perimeter edge that corresponds in shape to an identified outline of a physical object of interest, for example, as illustrated in FIGS. 3A-B.

Figure 3A:
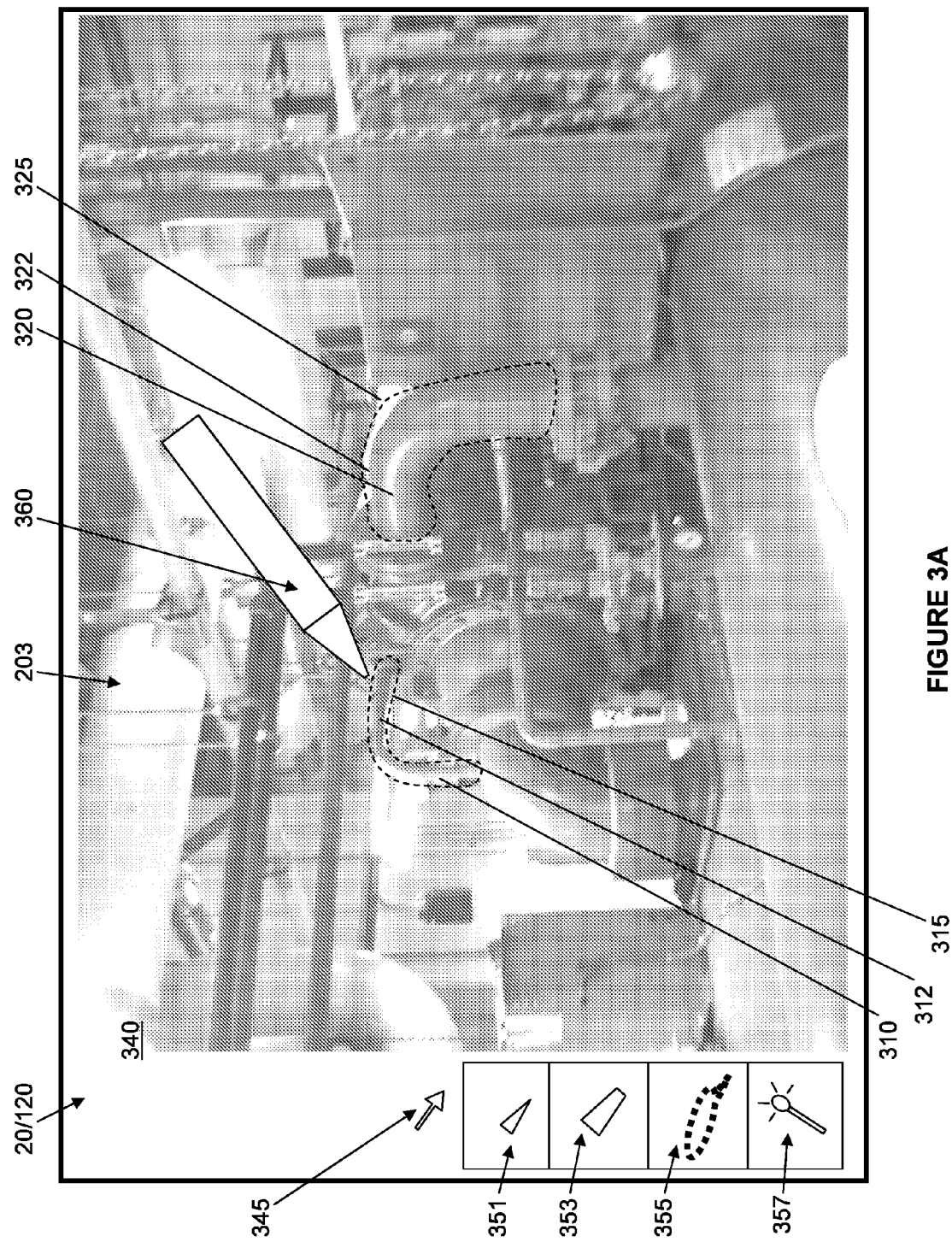
FIG. 3A is a schematic representation of a display of the system of FIG. 1, on which a VL image is presented, and of some interactive elements of the system, which may facilitate methods of the present invention.
Figure 3B:
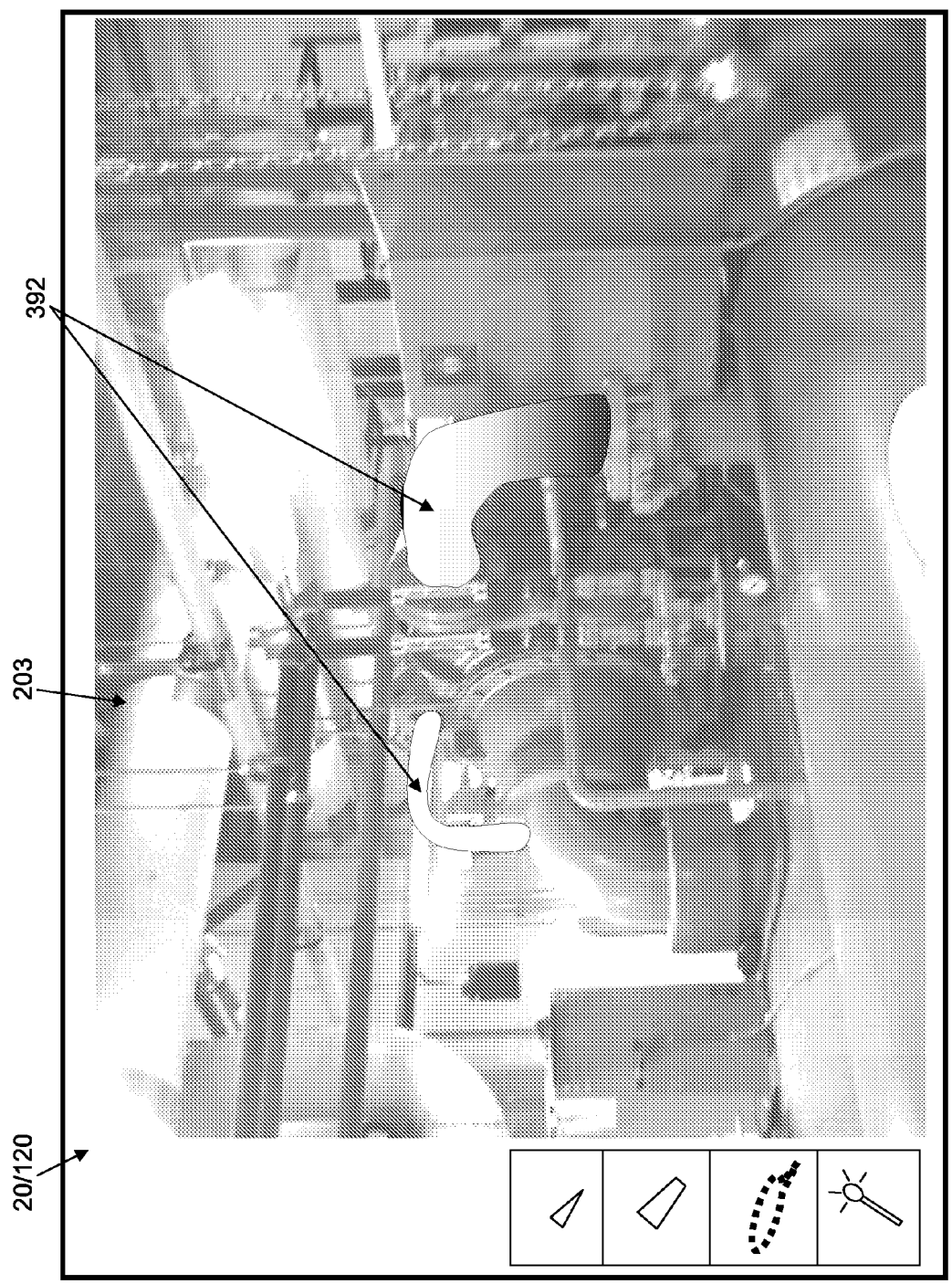
FIG. 3B is a schematic representation of the display of FIG. 3A including a thermal image, which is presented according to some methods of the present invention.

FIG. 3A is a schematic representation of one of displays 20, 120 of thermography system 100 (FIG. 1), on which VL image 203 is presented along with some interactive elements of a graphical user interface of the system, for accomplishing methods of the present invention. It should be noted that the interactive elements, as well as peripheral tools of system 100, as described below, are known to those skilled in the art. FIG. 3A illustrates a touch screen 340 as an interactive element for use in conjunction with a stylus 360, and a cursor 345 as an interactive element, which may be activated by stylus 360, buttons 22, mouse 105 and/or keyboard 103 (FIG. 1); optional drawing tools 351, 353, 355, 357, the general functions of which are performed by similar interactive elements of commercially available software packages (i.e. Adobe® Photoshop®), are also shown as interactive elements that may be used in conjunction with cursor 345 and/or stylus 360. FIG. 3A further illustrates perimeter edges 315 and 325 (shown with dashed lines) of a selected area that corresponds to a first object of interest 310 and a second object of interest 320. According to methods of the present invention, the display of VL image 203 is viewed in order to identify an outline 312, 322 of each of first and second objects 310, 320, and, then, one or more of interactive elements 340, 345, 350 may be employed to select the area defined by perimeter edges 315, 325. A thermal image of the objects of interest 310, 320, for example, thermal image 392, which is shown in FIG. 3B, is presented/displayed within the selected area, either during the selection or immediately following the selection. It should be noted that, alternatively, an area corresponding to either a single object of interest, or to more than two objects of interest, may be selected for a thermal image presented within a given VL image, and multiple objects of interest may overlap one another within the VL image.

According to some methods, a peripheral tool, or input device, such as stylus 360 or a finger, is placed in contact with touch screen 340 at one or more points along one or both of identified outlines 312, 322, in order to surround and, thereby, select the area, in which the thermal image will be presented, or is placed in contact with one or more points within one or both of identified outlines 312, 322, in order to fill in and, thereby, select the area. According to alternative methods, another type of peripheral tool/input device, such as buttons 22 (i.e. if VL image is being viewed on display 20 of camera 10) or mouse 105 and/or keyboard 103 (i.e. if VL image is being viewed on display 120 of workstation 110), is activated to place cursor 345 at one or more points along one or both of identified outlines 312, 322, in order to select the area, in which the thermal image will be presented, or to place cursor 345 at one or more points within one or both of identified outlines 312, 322, in order to select the area. If provided, one of drawing tools 351, 353, 355, 357, may be chosen, for example, using any one of the peripheral tools/input devices mentioned above, to select the area in one of the above-described manners. Drawing tool 351, which has a relatively fine point, for example, corresponding to a single pixel of VL image 203, may be used to select points along one or both of outlines 312, 322, for example, by activating tool 351 and moving the fine point thereof along outlines 312, 322 in order to select the corresponding area, while drawing tool 353, which has a relatively broader point, may be used to select points within one or both of outlines 312, 322, for example, by activating tool 353 and moving the broader point thereof to fill in and thereby select the corresponding area.

Drawing tool 355, which is depicted in the form of a lasso, is adapted to 'snap' to edges of contrast, for example, like those edges that, at least in part, define outlines 312 and 322 of objects 310 and 320, respectively, in VL image 203. Thus, a user may select the area within outlines 312, 322 by merely moving tool 355 into close proximity with a point on each outline 312, 322 and activating tool 355; upon activation, tool 355 will snap to the point on the edge of contrast and cling to the edge of contrast for selection of the corresponding area that is contained therein. Drawing tool 357, which is depicted in the form of a magic wand, is adapted to automatically select all neighboring pixels that are similar to one that is manually selected, with tool 357, by the user. Thus, the user may select at least a portion of area within outlines 312 and 322 of respective objects 310, 320, by merely moving tool 357 over a single point/pixel of each object 310, 320 and activating tool 357. The user of tools 355 and 357 may change the tolerances thereof according to contrast and/or color characteristics of the captured objects of interest, for example, objects of interest 310, 320 in VL image 203.

With further reference to FIG. 3A, it should be noted that each of perimeter edges 315, 325 of the selected area correspond in shape to the corresponding identified outline 312, 322 of objects 310, 320, so as to isolate these objects from the rest of the scene captured in VL image 203. Thus, a viewer who is interested in only analyzing and/or monitoring objects 310, 320 is not distracted by additional and extraneous thermal imaging of other portions of the captured scene. Of course perimeter edges 315, 325 need not exactly overlay identified outlines 312, 322, but may fall alongside the outlines, one side or the other, in close proximity thereto so as to closely match the shape thereof. Furthermore, although objects of interest 310, 320 are shown as separate sections of pipes, or ducts, in FIGS. 3A-B, it should be appreciated that, according to methods of the present invention, an object of interest is not so limited, and may, for example, include an entire single component within a captured scene or an assembly of components within a captured scene.

FIG. 3B illustrates thermal image 392 having a characteristic similar to that of thermal image 205, that is, being wholly composed of gray-scale coding corresponding to the measured temperature distribution of objects of interest 310, 320. Alternatively, thermal image 392 may be blended with the corresponding portion of VL image 203, and/or limited by at least one temperature threshold criterion, similar to thermal image 215 shown in FIG. 2B. According to some methods of the invention, certain characteristics, for the presentation of the thermal image within the selected area of the corresponding VL image, may be established either prior to or after selecting the area.

Some methods of the present invention, which may be employed for thermography in the context of analysis and/or monitoring, are outlined in the flow charts of FIGS. 4A-B. FIG. 4A shows a step 411 in which the capture of a thermal image and VL image, for display, precedes a step 413 in which the displayed VL image is viewed, and a step 415 in which an outline of each physical object of interest in the displayed VL image is identified. Once the outline of each object of interest is identified by the user, the user selects the corresponding area on the displayed VL image, for presenting/displaying the thermal image, per step 417. The flow chart of FIG. 4B outlines some alternative methods wherein initial steps 430, 432, 434 and 436 generally correspond to steps 411, 413, 415 and 417 of FIG. 4A, with the exceptions that capturing the thermal image, for display, per step 438, follows selecting the area, per step 436, and step 436 further includes storing the selected area in a memory of the thermography system. Any of the means described above, in conjunction with FIG. 3A, for selecting the area, on the displayed VL image, for the presentation of the thermal image, may be employed in steps 417, 436 of FIGS. 4A-B. As mentioned above, a step of establishing at least one characteristic for the presentation of the thermal image, prior to presenting the thermal image (419, 440), may be included in the methods outlined in FIGS. 4A-B, for example, in conjunction with selecting the area (417, 436). Examples of these characteristics were described above, in conjunction with FIGS. 2A-B, and include, without limitation, a blending of the thermal image with corresponding portions of the associated VL image, and/or a particular scaling for the gray-scale or color coding of the thermal image, and/or either no limitation on the extent of the presentation of the thermal image within the selected area, or a limitation on the extent of the thermal image, which limitation is based upon at least one temperature threshold criterion. Further characteristics include, without limitation, a marking, on the thermal image, with a temperature reading of a hot spot and/or a cold spot, for example, similar to those shown in FIG. 2A.

According to FIG. 4B, in order to assure alignment of the captured VL image (430) with the subsequently captured thermal image (438), for fusion of the two images, the camera and objects of interest may need to remain approximately stationary with respect to one another during the time that spans steps 430-438. If an object of interest is a moving part within a scene captured by the camera, for example, a robotic arm that is being monitored by the camera, the camera may have motion and or edge detection capability to re-map the corresponding selected area while the object moves within the scene, in order to facilitate capturing the corresponding thermal image, per step 438, at different times.

As mentioned above, step 436 includes storing the selected area in memory, so that when the thermal image is later captured, for example, during a monitoring period, the thermal image will only be presented/displayed within the selected area. If the thermal image is presented, per step 440, following completion of the monitoring period, the thermal image may be one of a series of thermal images that have been collected to document a thermal history of each object of interest, defined by the selected area, over the time of the monitoring period. Each thermal image, captured at step 438, may have been stored in the memory with a time stamp, for identification, and then presented, in sequence, for later viewing, per step 440; and, if a predetermined temperature threshold criterion has been established, then only those thermal images that meet the threshold criterion may be presented. According to some methods, if a monitoring camera having video capability, for example, camera 175 (FIG. 1), is employed, one may view, in real time, for example, via remote video monitoring on work station 110, the presented thermal image within the selected area as it changes during the monitoring period. Video data may also be stored, for example, in standard video files (i.e. mpeg4 or h.264 encoded) or in proprietary radiometric video files, for viewing at a later time. Accordingly, the steps of the method outlined in FIG. 4B, as well as those outlined in FIG. 4A, may be accomplished with a combination of still and video images, wherein presenting, per step 440 of FIG. 4B, and per step 419 of FIG. 4A, can take place in real time or at a later time, and the presented thermal image may be a video image or a series of still images that span a monitoring period.

With reference back to FIG. 4A, according to step 417, since the thermal image is captured, for display, per step 411, prior to selecting the area, per step 417, the thermal image may appear on the system display while the area in the VL image is being selected. For example, as either stylus 360 or one of drawing tools 351, 353, 355, 357 (FIG. 3A) is being positioned to select the area within identified outline 312 of object of interest 310, the thermal image may progressively appear along, or alongside, a trail of the drawing tool. Alternatively, an entirety of the thermal image may appear immediately following completion of the selection of the area corresponding to each object of interest. If more than one thermal image is captured, per step 411, to document a thermal history, for example, over a monitoring period as described above, then the thermal image presented/displayed in step 419 is one of a series of thermal images that have been stored in the memory of the thermography system, and these images may be presented in sequence, for viewing, per step 419. However, according to some methods, if a predetermined temperature threshold criterion has been established, then only those thermal images that meet the threshold criterion will be presented.

Figure 5A:
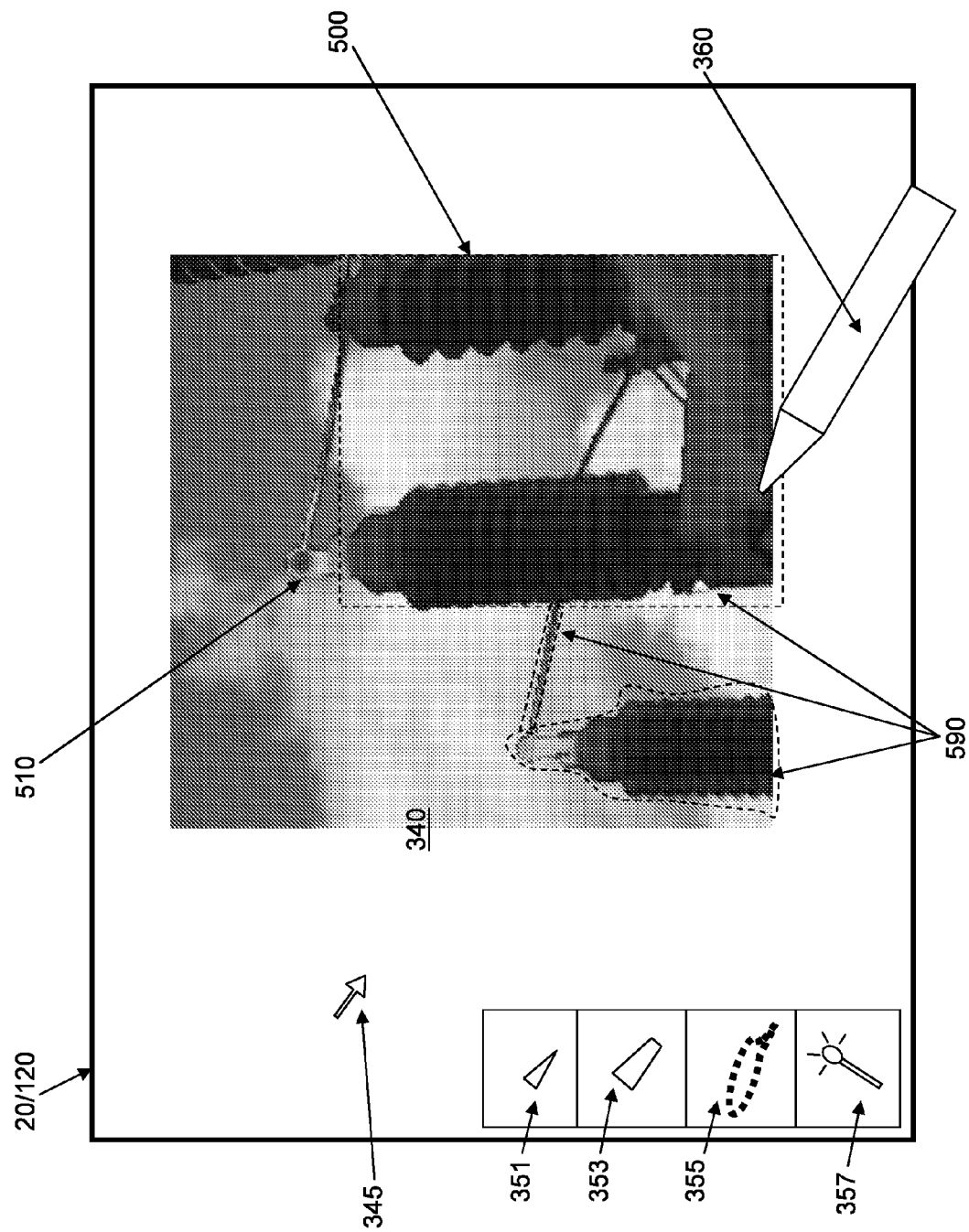
FIG. 5A is schematic representation of the display of the system of FIG. 1, on which a thermal image is presented, and some interactive elements of the system, which may facilitate additional methods of the present invention.
Figure 5B:
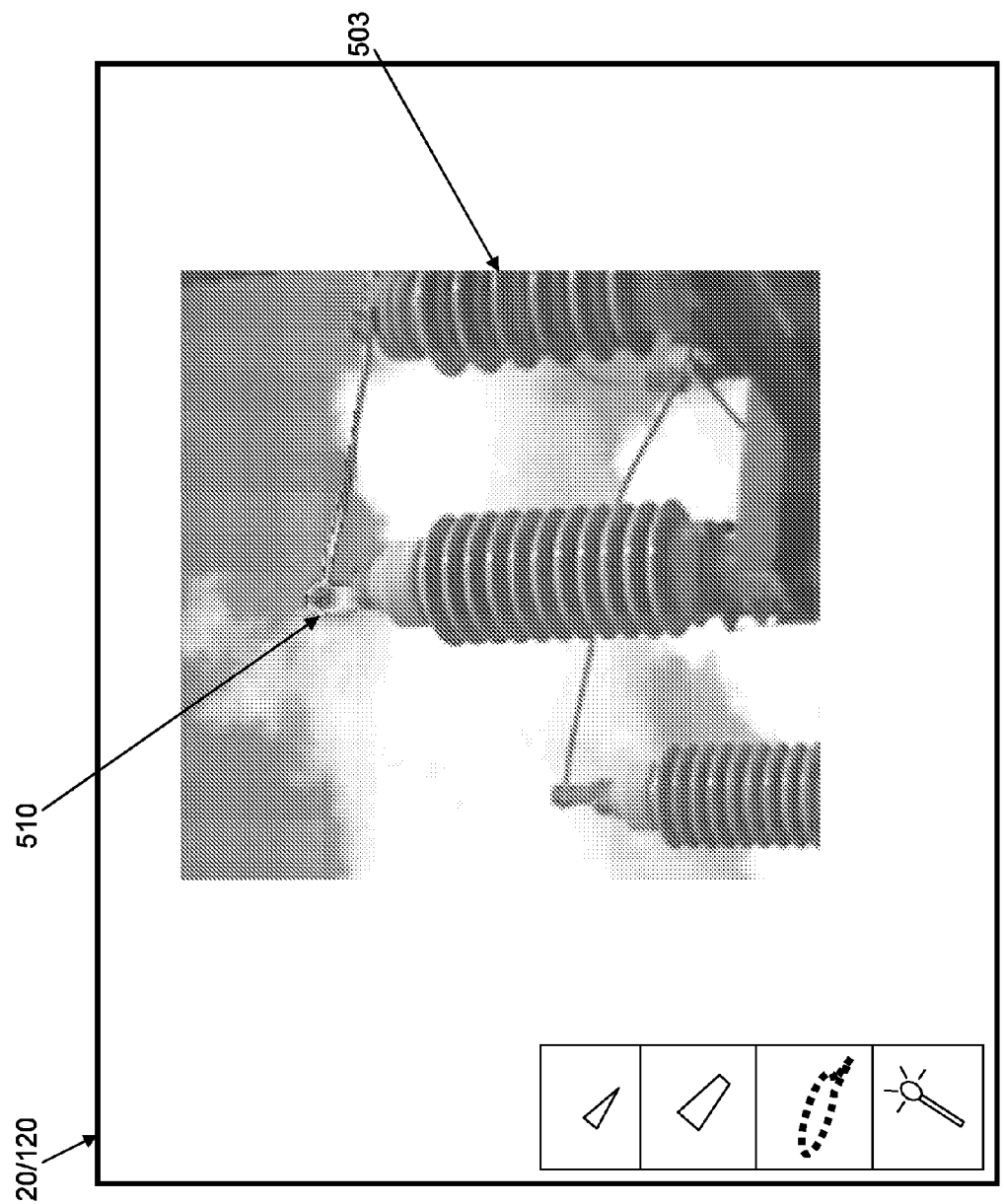
FIG. 5B is a schematic representation of the display of FIG. 5A on which a modified presentation of the thermal image is presented.

FIG. 5A is schematic representation of one of displays 20/120 of thermography system 100 (FIG. 1), wherein a captured thermal image 500 of a scene that includes a substation transformer is presented, along with the previously described interactive elements of the graphical user interface of system 100, which may facilitate additional methods of the present invention. FIG. 5A illustrates the interactive elements: touch screen 340, stylus 360, cursor 345 and optional drawing tools 351, 353, 355, 357 all of which were described, above, in conjunction with FIG. 3A. FIG. 5A further illustrates thermal image 500 including an identified area of interest 510, which corresponds to a particular physical part of the scene/substation transformer, along with other area 590, which is outlined with dashed lines. According to additional methods of the present invention, other area 590 of thermal image 500 are selected, via one of the interactive elements of system 100, for example, in any of the ways described above, in order to remove portions of thermal image 500 from area 590 and, thereby, display corresponding portions of a VL image 503, for example, as is illustrated in FIG. 5B. FIG. 5B is a schematic representation of display 20/120, on which the presentation of thermal image 500 has been modified to only include area of interest 510. Other area 590 of thermal image 500 have been removed in order to display VL image 503 of the remaining parts of the substation transformer that correspond to other area 590. With reference to FIG. 5B, as compared with FIG. 5A, it may be appreciated that the presentation of only area of interest 510 of thermal image 500, within the context of VL image 503 of the rest of the parts of substation transformer, can help to clarify information that is provided by the thermal image of the particular part of the substation transformer within area 510, thereby increasing an efficiency of analysis and/or monitoring.

Figure 6:
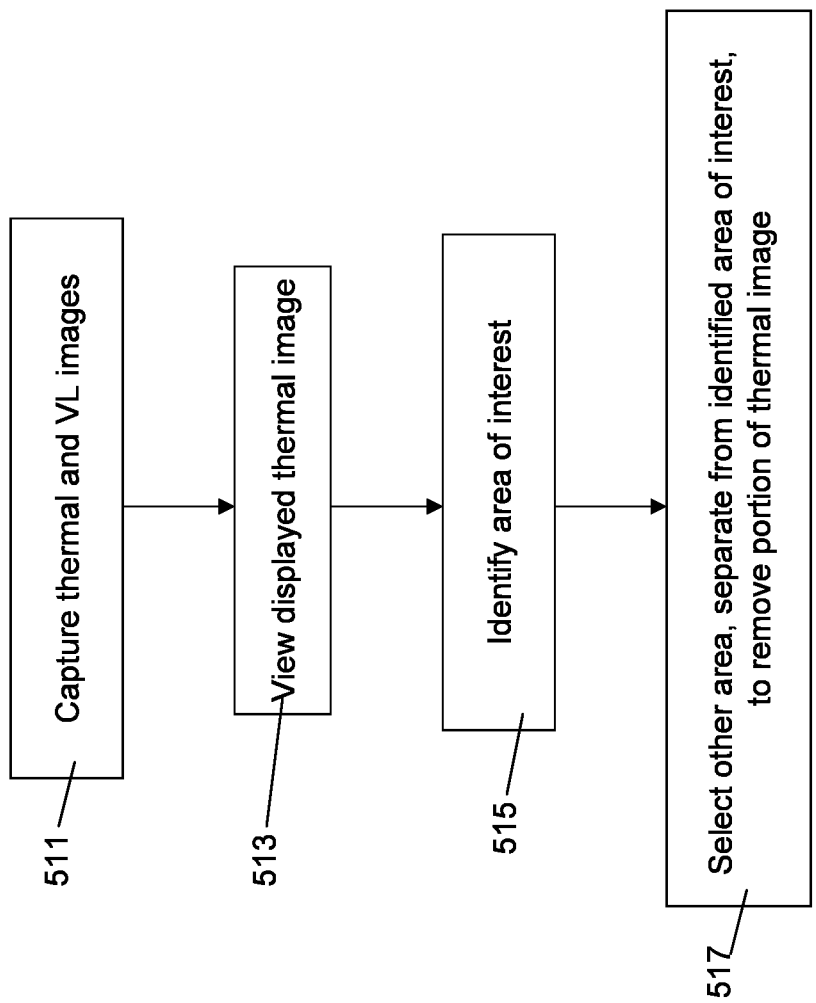
FIG. 6 is a flow chart outlining additional methods of the present invention.

FIG. 6 is a flow chart outlining the additional methods of the present invention, which may correspond to FIGS. 5A-B. FIG. 6 illustrates an initial step 511 in which thermal and VL images are captured, for display, prior to viewing the displayed thermal image, per step 513. Upon viewing the thermal image, the user identifies area of interest, per step 515, and then selects another area, which is separate from the identified area of interest, per step 517. Upon selection, the other area of the thermal image is removed so that corresponding portions of the VL image are displayed.

With reference back to FIG. 5A, according to some methods, selection, per step 517, is made by placing a peripheral tool, or input device, such as stylus 360 or a finger, in contact with touch screen 340 at one or more points along a perimeter, or perimeters, of the area of the displayed thermal image that is separate from the area of interest, for example, the perimeters of each portion of area 590, which is designated by the dashed lines. Alternately, the device is positioned over one or more points within the perimeter of the other area, for example, within one of the dashed lines surrounding area 590, to select the other area. According to alternative methods, another type of peripheral tool/input device, such as buttons 22, shown in FIG. 1 (i.e. if the thermal image is being viewed on display 20 of camera 10), or mouse 105 and/or keyboard 103, also shown in FIG. 1 (i.e. if the thermal image is being viewed on display 120 of workstation 110), is activated to position cursor 345 at one or more points on or within a perimeter of the area of the thermal image that is separate from the area of interest. If provided, one of drawing tools 351, 353, 355, 357 may be chosen, for example, using any one of the peripheral tools/input devices mentioned above, to select the other area in one of the above-described manners.

In the foregoing detailed description, the invention has been described with reference to specific embodiments. However, it may be appreciated that various modifications and changes can be made without departing from the scope of the invention as set forth in the appended claims.

We claim:

1. A method for presenting a thermal image of a scene within a visible light image of the scene, the thermal image and the visible light image being captured by a system that includes an infrared camera module, a visible light camera module and a display, and the method comprising:
viewing the visible light image of the scene on the display;
identifying an outline of each of at least two objects of interest within the visible light image; and
selecting, with an interactive element of the system, a plurality of non-overlapping areas of the visible light image, in which to present the thermal image on the display, the selected plurality of non-overlapping areas having perimeter edges within the captured visible light image that correspond in shape to the identified outlines of each of the at least two objects of interest, and either overlay the outlines, or resides alongside the outlines, in close proximity thereto;
the selection made in order to simultaneously display the thermal image within the perimeter edges of each of the selected areas of the visible light image and also to display the visible light image in the area of the captured visible light image that is outside of the perimeter edges.

2. The method of claim 1, wherein selecting the plurality of areas comprises using the interactive element to select one or more points along each of the identified outlines.

3. The method of claim 1, wherein selecting the plurality of areas comprises using the interactive element to select one or more points within the identified outlines.

4. The method of claim 1, wherein the presented thermal image progressively appears on the display while the areas are being selected.

5. The method of claim 1, wherein the presented thermal image appears on the display after the areas are selected.

6. The method of claim 5, wherein the presented thermal image appears in sequence with at least one other thermal image of the scene that corresponds to the selected areas, the other thermal image having been captured at a different time.

7. The method of claim 1, wherein the presented thermal image is a video image.

8. The method of claim 1, further comprising establishing at least one characteristic for the presentation of the thermal image within the selected areas.

9. The method of claim 8, wherein the at least one characteristic comprises a blending of the presented thermal image with portions of the visible light image that correspond to the selected areas.

10. The method of claim 8, wherein the at least one characteristic comprises a limitation on the extent of the presented thermal image, the limitation being based upon at least one predetermined temperature threshold criterion.

11. The method of claim 8, wherein the at least one characteristic comprises a marking, on the presented thermal image, with a temperature reading of one or both of: a hot spot and a cold spot.

12. The method of claim 1, wherein the presented thermal image is one of a series of presented thermal images of the scene corresponding to the selected areas, and the presented thermal image meets a predetermined temperature threshold criterion.

13. The method of claim 1, wherein the selecting is performed prior to capturing the presented thermal image, the selected areas being stored in a memory of the system and then applied to present the thermal image, when the thermal image is captured.

14. The method of claim 13, further comprising establishing at least one characteristic for the presentation of the thermal image within the selected areas.

15. The method of claim 14, wherein the at least one characteristic comprises a blending of the presented thermal image with a portion of the visible light image that corresponds to the selected areas.

16. The method of claim 14, wherein the at least one characteristic comprises a limitation on the extent of the presented thermal image, the limitation being based upon at least one predetermined temperature threshold criterion.

17. The method of claim 14, wherein the at least one characteristic comprises a marking, on the presented thermal image, with a temperature reading of one or both of: a hot spot and a cold spot.

18. A method for presenting a thermal image of a scene within a visible light image of the scene, the thermal image and the visible light image being captured by a system that includes an infrared camera module, a visible light camera module and a display, and the method comprising:

viewing the thermal image of the scene on the display;
identifying a plurality of non-overlapping areas of interest that corresponds to particular physical parts of the scene and each encompassed by a corresponding perimeter edge within the captured thermal image; and
selecting, with an interactive element of the system, another area of the thermal image, separate from the areas of interest and outside of the corresponding perimeter edges, the selection removing a portion of the thermal image, which corresponds to the other area, in order to display a corresponding portion of the captured visible light image within the other area outside of the perimeter edges.

19. The method of claim 18, wherein selecting the other area comprises using the interactive element to select one or more points along a perimeter of the other area.

20. The method of claim 18, wherein selecting the other area comprises using the interactive element to select one or more points within a perimeter of the other area.

21. The method of claim 1, wherein viewing the visible light image comprises viewing an image that is a visible light image exclusively.

22. The method of claim 1, wherein the visible light image intended for display outside the selected area is a visible light image exclusively.

23. The method of claim 1, wherein the thermal image intended for display inside the selected area is a thermal image exclusively.

* * * * *